United States Patent Office 3,464,730
Patented Sept. 2, 1969

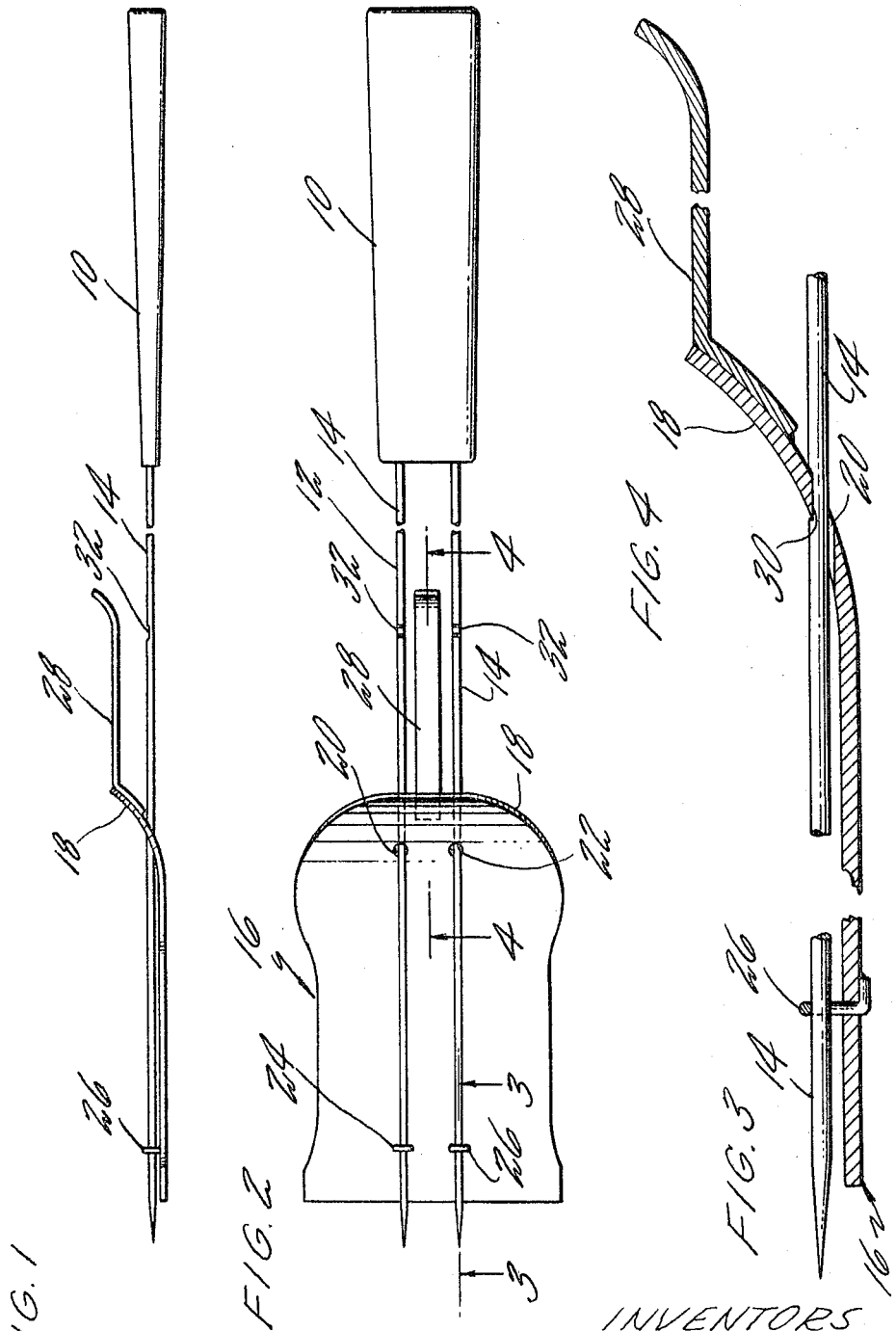

1

3,464,730
SPATULA-FORK
Anthony J. Gagliardi, 29 Berkley Ave., and Joseph Anthony Tellerico, Jr., Mount Vernon Road, both of Southington, Conn. 06489
Filed Dec. 5, 1967, Ser. No. 688,036
Int. Cl. A47j 43/18, 43/28
U.S. Cl. 294—2                                         3 Claims

ABSTRACT OF THE DISCLOSURE

A utensil, which may function as either a spatula or fork, comprising a fork having a pair of tines each of which has a pair of aligned notches formed therein. A plate or spatula member having an upwardly curved rear portion is provided with a pair of guides adjacent its forward end and a pair of holes through the upwardly curved rearward portion, each of the tines of the fork passing through a hole and guide whereby the spatula member may slide along the tines with the major portion thereof disposed below the tine. The spatula portion may be locked in any of many positions by engagement of the upwardly curved portion thereof at the holes therein with the notches in the tines, release of the spatula portion from the notches and movement thereof being facilitated by a rearwardly extending lifting member affixed to the spatula portion.

BACKGROUND OF THE INVENTION

Field of the invention

The present invention relates to culinary instruments. More particularly, the present invention is directed to a combination utensil which may be used as either a fork or spatula-scraper. Accordingly, the general objects of the present invention are to provide a novel and improved instrument of such character.

DESCRIPTION OF THE PRIOR ART

While not limited thereto in its utility, the present invention has been found to be particularly useful in cooking over an open fire such as, for example, on an outdoor grill. It is usually desired to cook a variety of foods at the same time. Thus, considering for example the situation where hamburgers and frankfurters are to be prepared simultaneously, the chef will presently have to have available both a spatula for turning the hamburgers and a fork for manipulating the frankfurters. The necessity of having two utensile available and finding a suitable, sanitary depository therefor and the need to switch back and forth between the two have proven to be inconveniences.

In the prior art there have been several combination cooking utensils or implements offered in the market place. Thus, several combination forks and spoons have been proposed and in some cases produced. In addition, forks have been proposed which are equipped with movable ejector mechanisms for dislodging food impaled on the tines. There has not, however, previously been a combined fork and spatula which, with a single utensil, permits either the impaling or turning of food.

It is also to be noted that the prior art combination utensils, such as the aforementioned spoon-fork combinations, have had the inherent deficiency that they lack a positive locking mechanism whereby the movable member, whether it be the fork or spoon portion, could be securely locked into both the storage and working positions.

2

SUMMARY OF THE INVENTION

The present invention overcomes the disadvantages of the prior art and, in so doing, provides a combination fork and spatula which is characterized by positive locking of the plate-like spatula member in both a working and a storage position. The present invention consists of a spatula member which is turned upwardly at its rear end and which is provided with a pair of holes in the upwardly turned portion and a pair of loop or guide members adjacent the forward end thereof. The tines of the fork, which are each provided with at least one pair of notches, are passed through the holes and guides in the spatula member and thus extend over the top of the spatula member. The spatula member has a limited degree of flexibility and thus, by means of a handle which extends rearwardly from the upwardly curved portion thereof, it may be lifted upwardly to free it from the locked position in the notches in the tines, thereby permitting movement from one locked position to the other. Multiple locked positions can be provided by increasing the number and location of notches in the tines.

BRIEF DESCRIPTION OF THE DRAWING

The present invention may be better understood and its numerous advantages will become apparent to those skilled in the art by reference to the accompanying drawing wherein like reference numerals refer to like elements in the various figures and in which:

FIGURE 1 is a side view of a preferred embodiment of the present invention with the spatula in the working position.

FIGURE 2 is a top view of the embodiment of FIGURE 1.

FIGURE 3 is an enlarged side view, taken along line 3—3 of FIGURE 2, of the embodiment of FIGURE 1 showing the tine guide means on the spatula.

FIGURE 4 is an enlarged side view, taken along line 4—4 of FIGURE 2, of the embodiment of FIGURE 1 depicting the locking mechanism of the present invention.

DESCRIPTION OF THE PREFERRED EMBODIMENT

The present invention comprises a modified, standard, long tined fork having a handle 10 of a material having a low coefficient of thermal conductivity. Handle 10 may, for example, be comprised of a plastic material. In the usual instance, handle 10 will be molded over a pair of parallel, elongated tines 12 and 14. Tines 12 and 14 will, of course, be tapered to points at the ends disposed opposite from handle member 10. Up to this point, the fork described is of conventional design.

A spatula member comprising a plate, indicated generally at 16, is shaped so as to have upwardly turned rearward portion 18. Spatula member 16 will preferably be formed from a metal having some resiliency and may be coated or uncoated with an antisticking material as desired. Holes 20 and 22 are of the same shape as the cross-sectional area of tines 12 and 14 and are of but slightly larger size.

Spatula member 16 also has, extending from the top surface thereof adjacent the leading edge, a pair of guide members 24 and 26. The guide members 24 and 26 are designed so that they will pass at least part way around tines 12 and 14 when the spatula member is installed on the fork, the guide members extending from spatula member 16 upwardly on the outside of the tines and then bending around so as to at least partly encircle the tines. In FIGURE 3, guide member 24 is shown as extending completely through spatula member 16, being bent over beneath the spatula member and being welded to the bottom surface thereof. Alternatively, the guide members may be affixed to the upper surface of the spatula member to thereby provide the spatula member with a smooth lower surface for sliding on a griddle or like cooking surface. As a third approach, spatula member 16 may be grooved so that the guide members, while passing therethrough, will be flush with the lower surface where bent over.

Spatula member 16 is also provided with a handle 28 which extends rearwardly therefrom. Handle member 28 is affixed to the upwardly curved portion 18 of spatula 16 by any suitable means, such as rivets or welding. As may best be seen from FIGURE 4, tines 12 and 14 are each provided with a pair of notches 30—30 and 32—32. The locating of notches 30 defines the working position of spatula member 16 while the location of notches 32 defines the stored position of spatula member 16. Of course, it will be understood that many positions for spatula 16 can be established by having more notches in the tines. Notches 30 and 32 are of width commensurate with the thickness of portion 18 of spatula member 16. With the spatula installed on the tines of the fork as shown, the top of holes 20 and 22 in portion 18 of the spatula will be engaged by either of notches 30—30 or 32—32 depending on whether the spatula is in the working or stored position. As noted above, spatula member 16 has a degree of flexibility and thus, by lifting upwardly on handle member 28, portion 18 of spatula member 16 may be distorted upwardly permitting it to be moved from one locked position to the other.

While a preferred embodiment has been shown and described, various modifications and substitutions may be made without departing from the spirit and scope of this invention. Accordingly, it is to be understood that this invention has been described by way of illustration rather than limitation.

What is claimed is:
1. A utensil comprising:
 a handle;
 a pair of substantially parallel tines extending from said handle, said tines being provided with at least two pair of oppositely disposed notches;
 a spatula member having a plate-like forward portion and an upwardly curving rear portion, said spatula member having a pair of holes in the upwardly curved portion and a pair of guides extending from the upper surface of the plate-like portion, said tines of said fork passing through said holes and being engaged by said guides; and
 a release member extending from said spatula member.
2. The untensil of claim 1 wherein said spatula member is sufficiently flexible to enable movement thereof into and out of engagement with said notches in said tines by means of said release member.
3. The untensil of claim 1 wherein said release member comprises a second handle extending rearwardly from said upwardly curved portion of said spatula member.

References Cited
UNITED STATES PATENTS

| 1,089,118 | 3/1914 | Emory | 294—2 |
| 2,110,640 | 3/1939 | Aldrich | 294—2 |

EVON C. BLUNK, Primary Examiner

D. WATTS, Assistant Examiner

U.S. Cl. X.R.
294—7